(12) United States Patent
Carrier et al.

(10) Patent No.: US 6,915,938 B2
(45) Date of Patent: Jul. 12, 2005

(54) METHOD AND APPARATUS FOR REDUCING COMPONENT VIBRATION DURING INERTIA WELDING

(75) Inventors: Charles William Carrier, West Chester, OH (US); Steven A. Ross, Cincinnati, OH (US); Robert R. Kursmark, Cincinnati, OH (US); Chris League, Cincinnati, OH (US); John Absi, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/309,855

(22) Filed: Dec. 4, 2002

(65) Prior Publication Data

US 2004/0108358 A1 Jun. 10, 2004

(51) Int. Cl.⁷ ............................................. B23K 1/06
(52) U.S. Cl. ................... 228/2.1; 228/1.1; 228/112.1; 228/113
(58) Field of Search ........................... 228/112.1, 113, 228/114, 114.5, 111, 1.1, 102, 2.1; 156/580

(56) References Cited

U.S. PATENT DOCUMENTS

| | | | |
|---|---|---|---|
| 3,552,629 A | * | 1/1971 | Armbruster et al. ......... 228/1.1 |
| 3,877,629 A | | 4/1975 | Louw et al. |
| 3,937,305 A | | 2/1976 | Bossche |
| 4,044,628 A | * | 8/1977 | Jacks .......................... 74/574 |
| 4,615,237 A | * | 10/1986 | Forkel ......................... 74/574 |
| 5,486,262 A | * | 1/1996 | Searle ......................... 156/580 |
| 5,735,446 A | | 4/1998 | White et al. |
| 6,138,897 A | | 10/2000 | Allor et al. |
| 6,152,350 A | * | 11/2000 | Hayashi et al. ............. 228/102 |
| 6,284,360 B1 | | 9/2001 | Johnson et al. |
| 6,309,985 B1 | | 10/2001 | Virnelson et al. |
| 6,345,942 B1 | | 2/2002 | Cook |
| 6,348,118 B1 | | 2/2002 | Johnson et al. |
| 6,377,145 B1 | * | 4/2002 | Kumagai .................... 335/274 |
| 6,592,111 B2 | * | 7/2003 | Nishi et al. ............ 267/140.13 |
| 2002/0081957 A1 | | 6/2002 | Cisneros et al. |

* cited by examiner

Primary Examiner—Lynne R. Edmondson
(74) Attorney, Agent, or Firm—V. G. Ramaswamy; Sonnenschein Nath & Rosenthal LLP

(57) ABSTRACT

A damper for reducing vibration in a least a portion of a component during inertia welding. The damper includes a generally annular body having a spiral slot formed therein.

16 Claims, 6 Drawing Sheets

METHOD AND APPARATUS FOR REDUCING COMPONENT VIBRATION DURING INERTIA WELDING

BACKGROUND OF THE INVENTION

The present invention relates generally to inertia welding, and more particularly to a method and apparatus for reducing component vibration during inertia welding.

Inertia welding is a process in which one component is rotated about an axis and brought in contact with a second component. Frictional forces between the components heat up the interface between the components sufficiently that the components melt and a weld is produced at the interface. Depending on the geometry of the components, the friction between the components can also induce vibrations in the components thereby causing stresses in the components. For example, when portions of a gas turbine engine compressor spool are inertia welded, each portion is clamped at their respective rim to an inertia welding machine. One portion is rotated and brought in contact with the other portion. As the portions are welded, one or more bores of the spool may vibrate, deflecting axially with respect to the spool centerline thereby causing stresses in the webs of the spool adjacent the rims. These stresses can cause the components to fail during welding or prematurely during later use.

Conventionally, the vibrating portions of the components are clamped tightly to prevent or reduce deflections, thereby reducing the stresses. Although this method works well, the portions of the components that vibrate are not always accessible for clamping. For example, the bores of a compressor spool are not easily accessible for clamping. Accordingly, a method and apparatus for reducing vibration in inaccessible portions of components is needed.

Although damping materials exist which can be applied to components to reduce vibration, these materials are difficult to apply in inaccessible areas of the components. Further, components such as gas turbine rotors which spin at high velocities require that all of the damping material be removed from the components prior to use. Otherwise, the residual damping material will cause component imbalance and potentially component failure. However, removal of the residual damping material is particularly difficult when the material is applied to difficult to access areas of the component.

SUMMARY OF THE INVENTION

Briefly, the present invention includes a damper for reducing vibration in at least a portion of a component during inertia welding. The damper comprises a generally annular body having a spiral slot formed therein.

In another aspect, the invention includes a method of reducing vibration in at least a portion of a first component when inertia welding the first component to a second component. The method comprises bonding an elastomeric damper to the portion of the first component. The first component is inertia welded to the second component, and the damper is removed from the portion of the first component.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
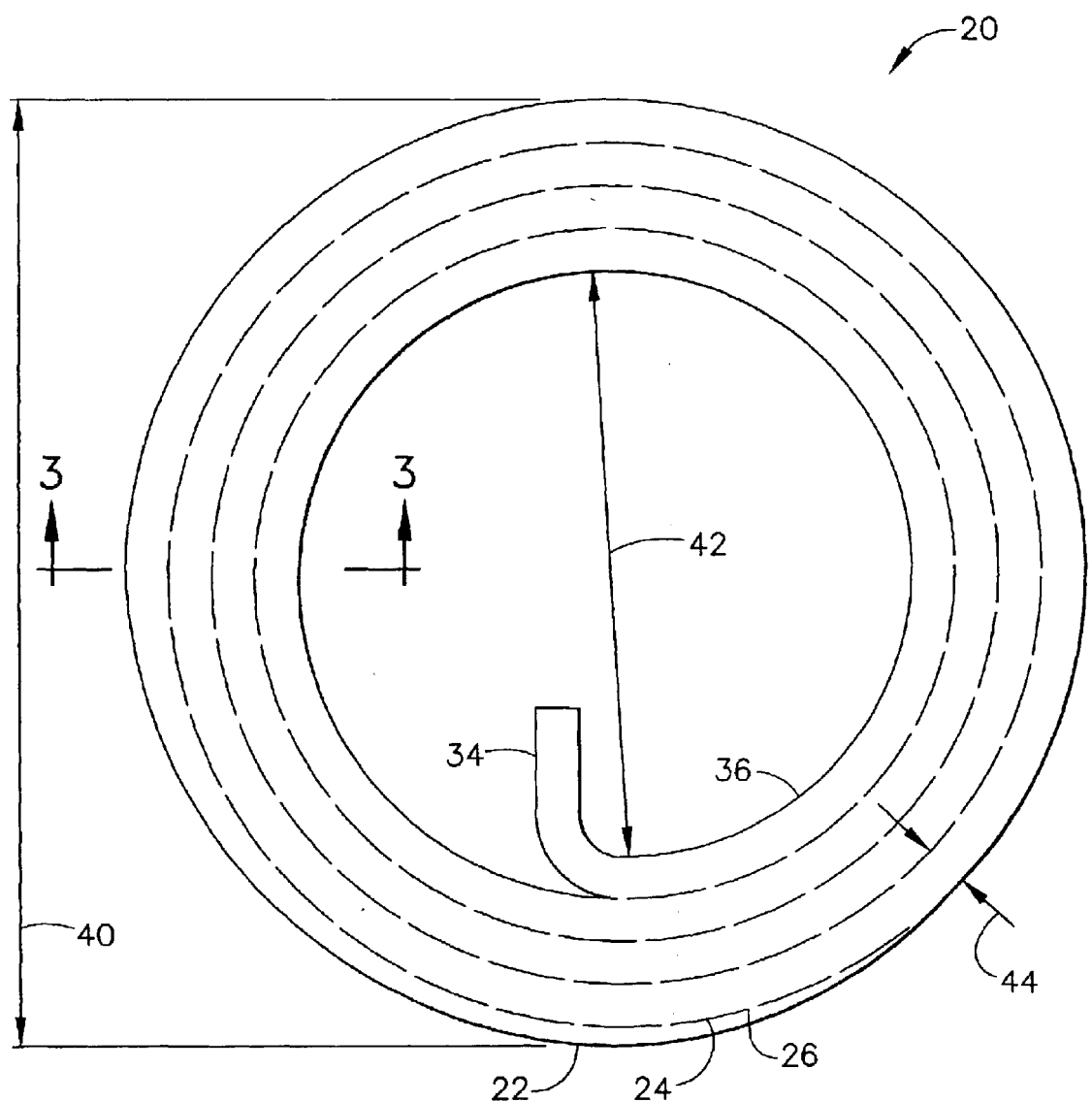
FIG. 1 is an end view of a first embodiment of the damper of the present invention.

Referring now to the drawings and in particular to FIG. 1, a first embodiment of a damper of the present invention is designated in its entirety by the reference numeral 20. The damper 20 has an annular body 22. A spiral slot 24 is formed in the body 22. In one embodiment illustrated in FIG. 2, the slot 24 is interrupted along its length thereby forming frangible connections 26 between adjacent turns of the damper 20. Although the connections 26 may have other spacings without departing from the scope of the present invention, in one embodiment, the connections are equally spaced about the damper 20. For example, in one embodiment each connection 26 has a width 28 of about 0.08 inch. Further, each slot has a width 30 of about 0.05 inch and an arc length 32 of about 4.50 inches.

As further illustrated in FIG. 1, the damper 20 has a pull 34 extending inward from an inner edge 36 of the body 22 for removing the damper from the component after inertia welding as will be explained in greater detail below. In one embodiment, the damper 20 is formed from an energy absorbing material such as an elastomeric material. One such elastomeric material is an ISODAMP C-2003-125psa elastomeric sheet material available from E-A-R Corporation of Indianapolis, Ind. ISODAMP is a federally registered trademark of Cabot Safety Intermediate Corporation of Southbridge, Mass.

Although the body 22 may have other dimensions without departing from the scope of the present invention, in one embodiment the body has an outer diameter 40 of about 24.50 inches and an inner diameter 42 of about 14.00 inches. Further, although other configurations are envisioned, in one embodiment the slot 24 encircles the body 22 at generally evenly spaced intervals between the inner diameter 40 and the outer diameter 42. Although these intervals may have other widths without departing from the scope of the present invention, in one embodiment each of the intervals has a width 44 of about one inch.

Figure 3:
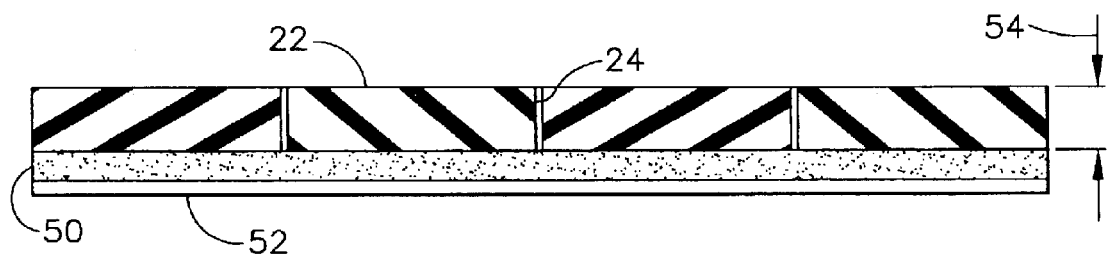
FIG. 3 is a cross section of the first embodiment of the damper taken along line 3—3 of FIG. 1.

As illustrated in FIG. 3, the damper 20 has an adhesive layer 50 applied to one face of the body 22 for releasably bonding the damper to a component during use. A release film 52 is releasably attached to the adhesive layer 50 for preventing inadvertent contact with the adhesive prior to use. Although other configurations are envisioned, in one embodiment the body 22 has a generally uniform thickness. Although the body 22 may have other thicknesses without departing from the scope of the present invention, in one embodiment the body 22 has a thickness 54 between about 0.10 inch and about 0.125 inch. In another embodiment, the body 22 has a thickness 54 of about 0.10 inch.

Figure 4:
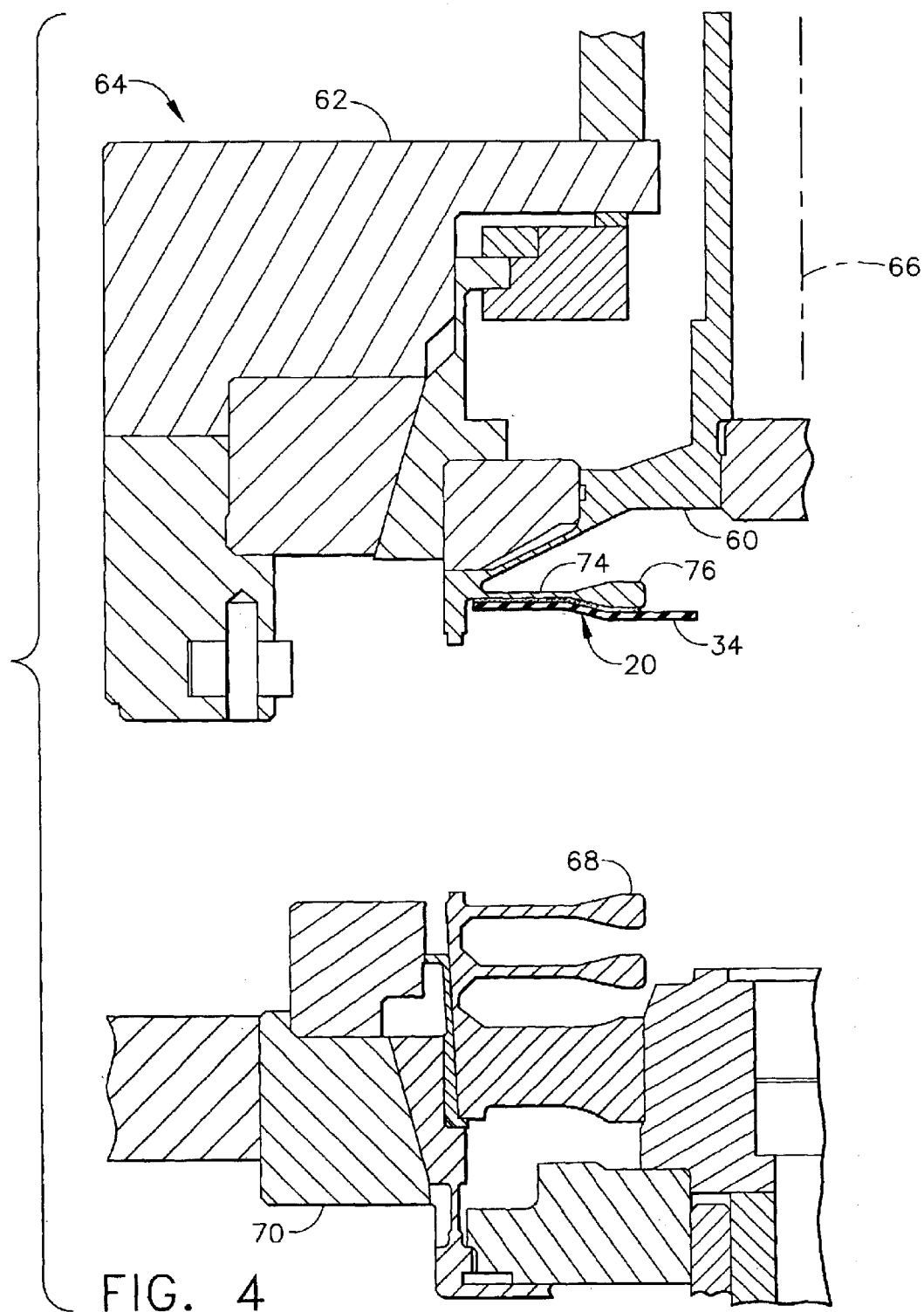
FIG. 4 shows the damper mounted on one of two components in an inertia welding machine.
Figure 5:
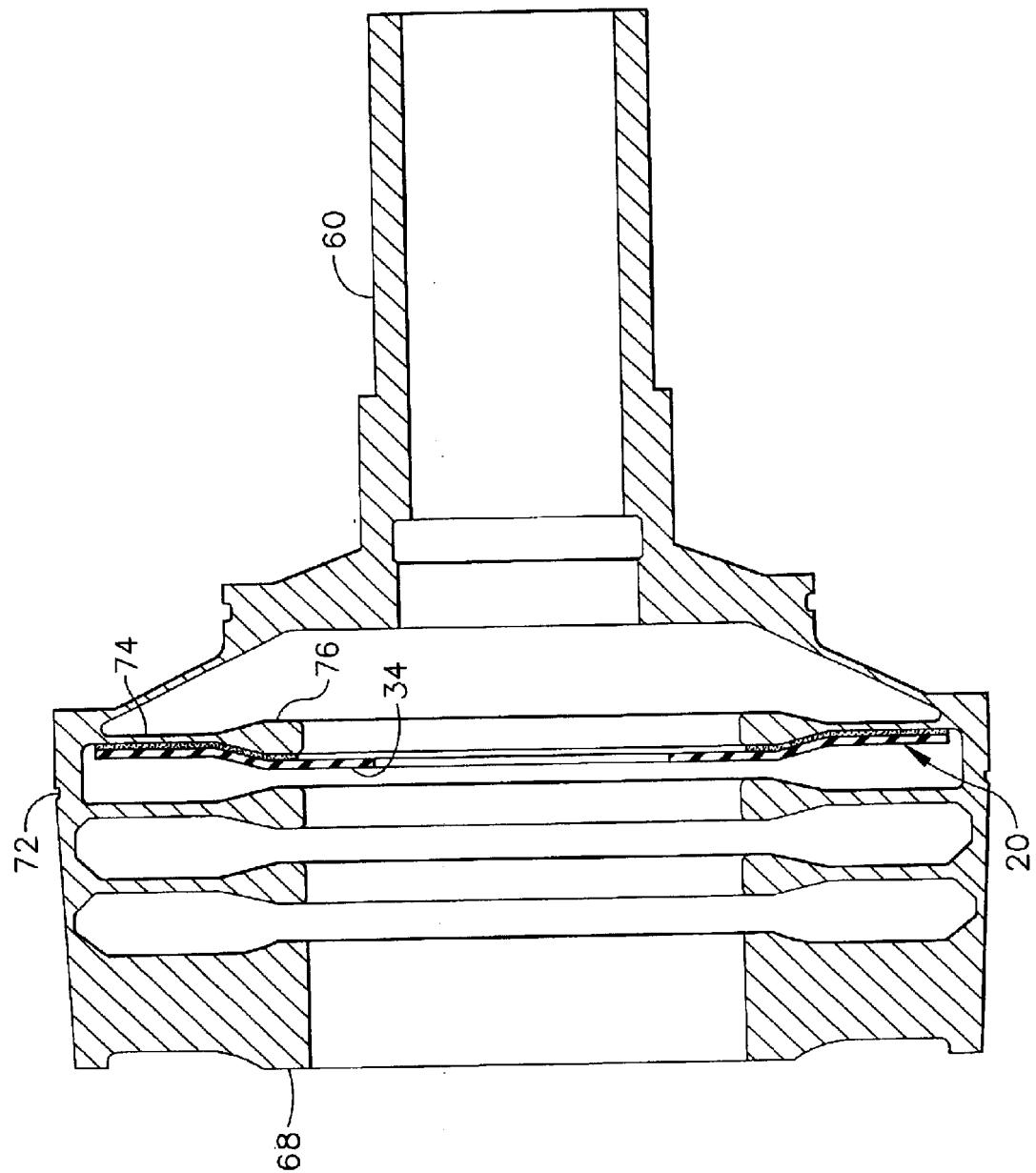
FIG. 5 is a cross section of the components and damper after inertia welding.

The damper 20 of the present invention is used to reduce vibration in at least a portion of a component during inertia welding. As illustrated in FIG. 4, inertia welding is a process in which one component 60 (e.g., an aft portion of a compressor spool) mounted on a heavy flywheel 62 of a conventional inertia welding machine, generally designated by 64, is rotated about an axis 66 and brought in contact with a second component 68 (e.g., a forward portion of a compressor spool) mounted on a base 70 of the inertia welding machine. Frictional forces between the components 60, 68 heat the interface 72 between the components sufficiently that the components melt and a weld is produced at the interface so the components are permanently joined together as illustrated in FIG. 5. As previously explained, the friction between the components 60, 68 also causes vibrations in the components. For example, in the case of the compressor spool shown in FIGS. 4 and 5, the web and bore, 74, 76, respectively, of the last stage of the spool tend to deflect axially back and forth during inertia welding. To prevent the deflection, an elastomeric damper 20 is bonded to an annular face of the first component 60 comprising the web and bore 74, 76 of the last stage of the component as shown in FIG. 4 prior to welding. The damper 20 is bonded to the component 60 by removing the release film 52 from the adhesive layer 50, positioning the damper in the desired location on the component 60 and pressing the damper in place against the component. The first and second components 60, 68 are inertia welded using conventional parameters. After inertia welding, the damper 20 is not easily accessible because of the annular face of the first component 60 to which the damper is bonded is inside the compressor spool as illustrated in FIG. 5. The damper 20 may be removed by an operator who grasps the pull 34 and withdraws the damper through the opening formed by the bores of the joined components. The frangible connections 26 separate as the damper 20 is removed so the damper unwinds as it is removed. The joined components 60, 68 may be finish machined to remove residual adhesive 50.

Figure 2:
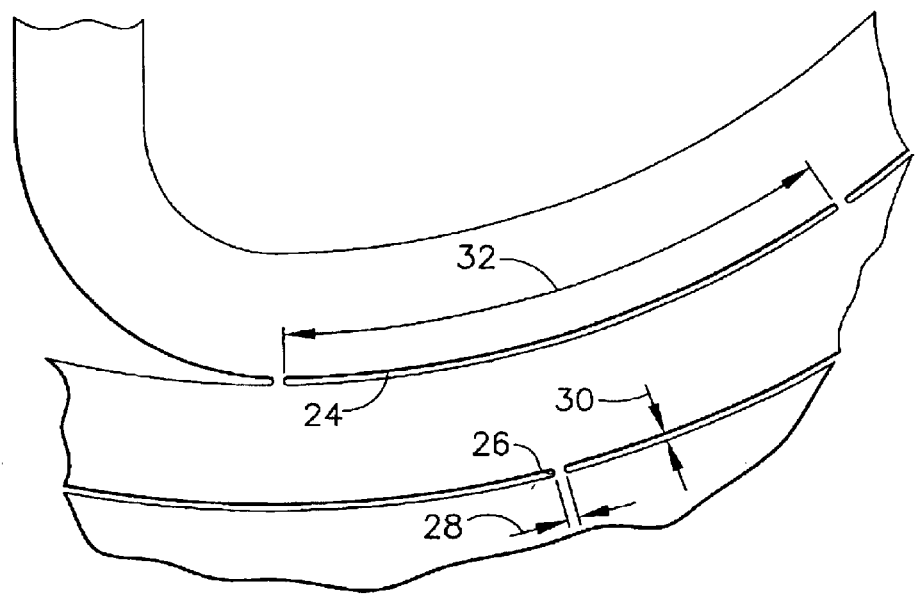
FIG. 2 is a detail of the end view of FIG. 1.
Figure 6:
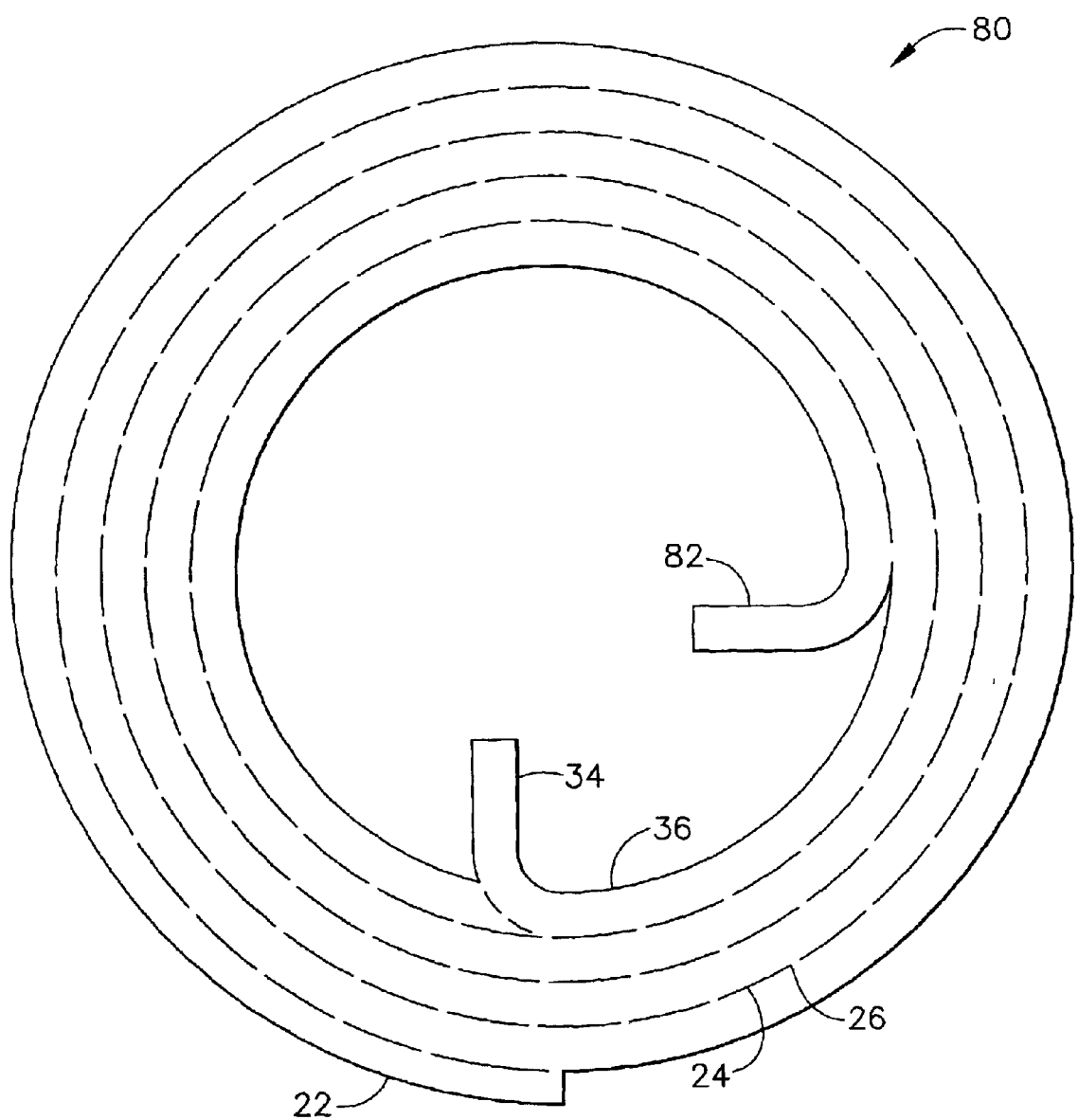
FIG. 6 is an end view of a second embodiment of the damper of the present invention.
Figure 7:
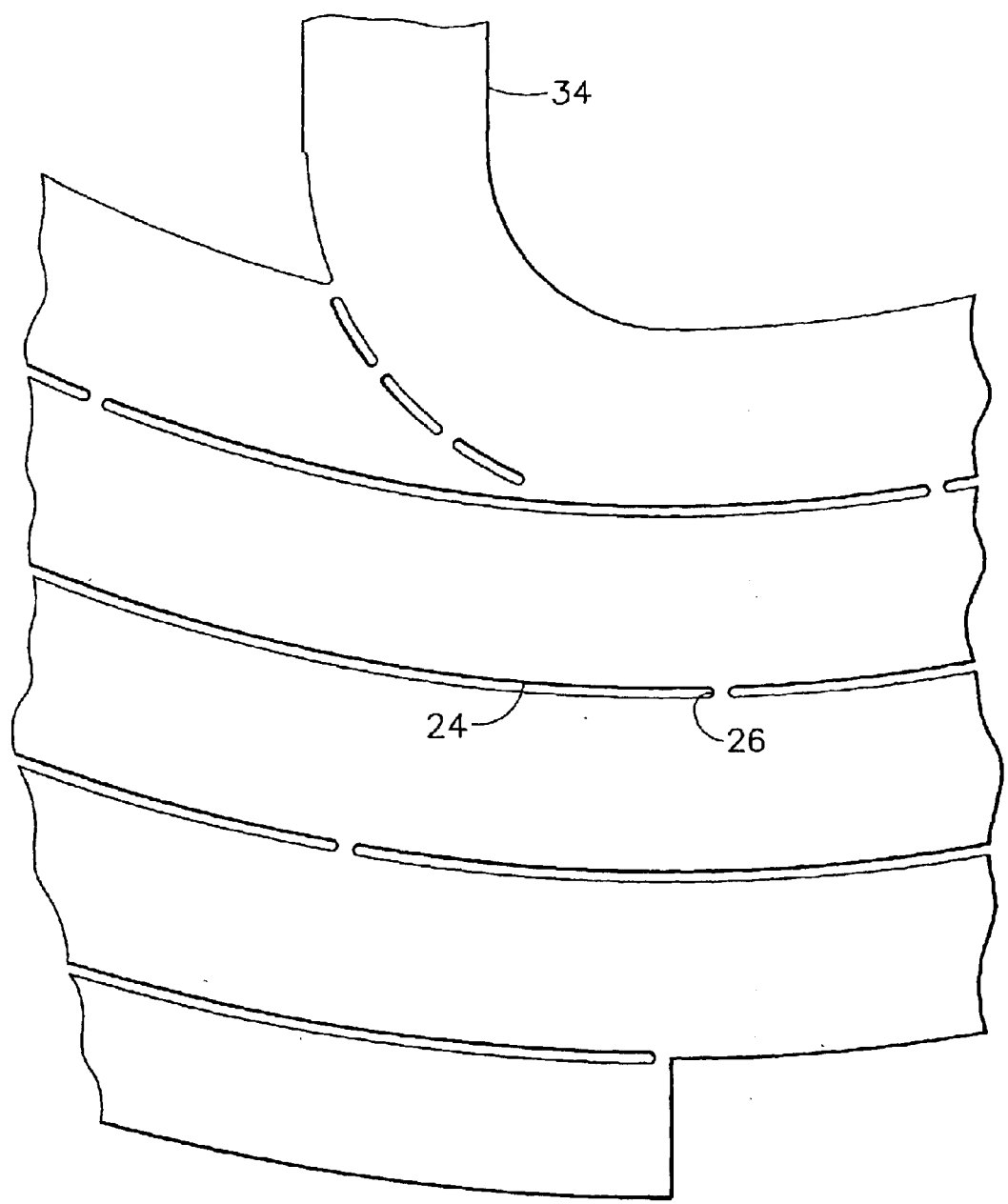
FIG. 7 is a detail of the end view of FIG. 6.

FIGS. 6 and 7 illustrate a second embodiment of the damper 80 of the present invention which is similar to the damper 20 of the first embodiment shown in FIGS. 1–3 except that it has a second pull 82. The damper 80 of the second embodiment may be used to weld either of two different size compressor spools (e.g., a GE model CF6 stage 10–14 compressor spool or a model GE90 stage 7–9 compressor spool). When the damper 80 is used on the engine model having the spool with the larger bore diameter, the second pull 82 is separated from the damper prior to use so the damper has a larger inner diameter. However, when the damper 80 is used on the engine model having the spool with the smaller bore diameter, the second pull 82 is left on the damper during use so the damper has a smaller inner diameter. Similarly, the outer diameter of the damper may be varied by separating one or more of the outer turn(s) prior to use.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A damper for reducing vibration in at least a portion of a component during inertia welding, said damper comprising:

a generally annular body having a spiral slot formed therein; and a pull extending inward from an inner edge of the body for pulling the damper to remove the damper from the component after inertia welding.

2. A damper for reducing vibration in a least a portion of a component during inertia welding, said damper comprising:

a generally annular body having a spiral slot formed therein;

an adhesive applied to a face of the body for releasably bonding the damper to the portion of the component; and a release film releasably attached to the adhesive for preventing inadvertent contact with the adhesive.

3. A damper for reducing vibration in at least a portion of a component during inertia welding, said damper comprising a generally annular body having a spiral slot formed therein, wherein the slot is interrupted along its length thereby forming at least one connection between adjacent turns of the damper at a position between an outer end of the slot and an inner end of the slot.

4. A damper as set forth in claim 3 wherein the connections are equally spaced about the damper.

5. A damper as set forth in claim 2 comprising an elastomeric material.

6. A damper for reducing vibration in a least a portion of a component during inertia welding, said damper comprising a generally annular body having a spiral slot formed therein, an outer diameter of about 24.50 inches and an inner diameter of about 14.00 inches.

7. A damper as set forth in claim 6 wherein the slot encircles the body at generally evenly spaced intervals between the inner diameter and the outer diameter.

8. A damper as set forth in claim 7 wherein the generally evenly spaced intervals at which the slot encircles the body have a width of about one inch.

9. A damper as set forth in claim 8 wherein the body has a generally uniform thickness.

10. A damper as set forth in claim 9 wherein the thickness is about 0.10 inch.

11. A method of reducing vibration in at least a portion of a first component when inertia welding said first component to a second component, said method comprising the steps of:

bonding an elastomeric damper to the portion of said first component;

inertia welding said first component to said second component; and removing the damper from the portion of said first component once the first component is welded to said second component.

12. A method as set forth in claim 11 wherein the damper is bonded to an annular face of said first component.

13. A method as set forth in claim 12 wherein the annular face of the first component is surrounded by an annular shell after said first component and said second component are inertia welded.

14. A method as set forth in claim 13 wherein the damper is withdrawn through an opening at an end of the annular shell when the damper is removed from the portion of said first component.

15. A method as set forth in claim 14 wherein the damper is generally annular and has a free end following inertia welding, and said free end is pulled inward away from the annular face of said first component when the damper is removed from the portion of said first component thereby unwrapping the damper as it is removed from the first component.

16. A method as set forth in claim 12 wherein the annular face is machined after removing the damper to remove residue from the face.

* * * * *